July 26, 1960 G. JENDRASSIK 2,946,184
PRESSURE EXCHANGERS AND APPLICATIONS THEREOF
Filed Nov. 5, 1952 3 Sheets-Sheet 1

Inventor
George Jendrassik
By Stevens, Davis, Miller & Mosher
his Attorneys

July 26, 1960     G. JENDRASSIK     2,946,184
PRESSURE EXCHANGERS AND APPLICATIONS THEREOF
Filed Nov. 5, 1952     3 Sheets-Sheet 3

Inventor
George Jendrassik
By Stevens, Davis, Miller & Mosher
his Attorneys

United States Patent Office 2,946,184
Patented July 26, 1960

2,946,184
PRESSURE EXCHANGERS AND APPLICATIONS THEREOF

George Jendrassik, London, England; Andre G. T. Boszormenyi and Clara Jendrassik, executors of said George Jendrassik, deceased, assignors, by mesne assignments, to Jendrassik Developments Limited, London, England Filed Nov. 5, 1952, Ser. No. 318,919

Claims priority, application Great Britain Nov. 8, 1951

12 Claims. (Cl. 60—35.6)

This invention relates to pressure exchangers and to applications thereof. Pressure exchangers have been previously proposed in which work is transmitted from a fluid of higher pressure level to a fluid at a lower pressure level. Suggested apparatus for this purpose has comprised a cell wheel with end plates adjacent the ends thereof through which fluid is delivered to and discharged from the cells. In such apparatus the cell wheel and end plates are relatively rotatable. In one proposed pressure exchanger the transmission of work capacity was to be performed by fluid pressure impulses within the cells whilst in others the expansion of fluid from one cell effected compression of fluid in another. Scavenging through the cells at one stage of operation is a common expedient.

The present invention provides a pressure exchanger comprising a number of cells each of which is placed in communication at its ends with fluids at different pressure levels so that there is at such times a pressure difference between the two ends of the cell and so that, by acceleration and deceleration of fluid within the cells, work is transmitted between fluid communicating with the pressure exchanger at the different pressure levels.

The cells of such a pressure exchanger may conveniently be arranged annularly around the periphery of a cell wheel which is rotatable relatively to an adjacent end plate. Through that end plate the cells may have access to a plurality of ducts circumferentially spaced relative to the axis of rotation, through which fluids at different pressure levels are delivered to the cells. At the other end of the cells from that end plate communication may be obtained to one or more ducts maintained at pressure levels different from those of the delivered fluid; a similarly arranged end plate may be incorporated at this other end also. The width of the duct passages through an end plate and their mutual relationship are preferably arranged so that in a normal operation most advantageous use is made of acceleration and deceleration impulses caused in the fluid within a cell as the latter moves relatively to the duct passages.

A pressure exchanger according to the invention is stated above to have in operation a pressure difference between the two ends of a cell. In certain instances it is convenient to transform a fluid pressure into a velocity component, for example one end of a cell may be deliberately made convergent in cross sectional area so that fluid is discharged therethrough at a higher speed than it otherwise would be. Such an increase in velocity at the expense of fluid pressure and similar transformations are intended to be maintained within the scope of the invention.

The present invention further provides a pressure exchanger comprising a number of cells each of which in turn is placed in communication at one end with fluid at two different pressure levels alternatively and at its opposite end only with fluid at a pressure level between said different pressure levels.

As an extension of the latter pressure exchanger each of the cells at its said one end may be placed in communication with a plurality of fluid sources at different pressure levels in succession and at its opposite end only with fluid at a pressure level intermediate between the extremes of said pressure levels.

According to the invention there is provided a pressure exchanger which is arranged substantially to equalize the pressure of fluids at a plurality of pressure levels comprising a cell wheel, and end plate adjacent thereto, means for effecting relative rotation between the cell wheel and the end plate, a plurality of ducts through each of which one of said different pressure fluids is conveyed to the end plate for delivery to the cell wheel, the arrangement being such that every cell in turn is placed in communication at one end with said ducts in succession, and a common duct whose internal pressure is maintained at a level intermediate between the extreme pressures of said delivered fluids into which fluid is discharged from the other end of the cells.

The latter is a special form of pressure exchanger, that is one which receives fluids at different pressure levels and in effect discharges fluid at an intermediate pressure level, this apparatus may be termed a pressure equalizer.

The invention also provides a pressure exchanger which is arranged to produce from a fluid delivered thereto supplies a fluid at a plurality of pressure levels, at least one being higher and another lower than the pressure of said delivered fluid, comprising a cell wheel, an end plate adjacent thereto, means for effecting relative rotation between cell wheel and end plate, a duct through which said delivered fluid is passed to one end of every cell and a plurality of ducts extending downstream of the cell wheel from the end plate each of which ducts is maintained at a different internal pressure level at least one being higher and another lower than the pressure of said delivered fluid and into which ducts fluid is discharged from the other end of the cells.

The latter is another special form of pressure exchanger, that is one in which delivered fluid transmits work to fluid leaving at a higher pressure, further fluid leaving at a lower pressure. This form of pressure exchanger may be termed a pressure divider.

Pressure exchangers according to the present invention have several distinguishing features from those according to the prior art. For instance embodiments of the present invention function as a result of practically continuous presence of acceleration or deceleration fluid pressure impulses within any cell. There is no appreciable cell scavenging taking place at any stage in the operation of the apparatus. Moreover the prior proposals have been always for pressure exchangers forming the major part of either a heat engine or a heat pump. It has been a common factor of previously suggested pressure exchangers for fluid extracted from the cell wheel of the exchanger to be reintroduced, e.g. after heating, into the cell wheel. This feature is not present in embodiments of the present invention.

In this case, as with the prior art, the fluids between which work is transmitted are most conveniently in gaseous state. However pressure exchangers according to the present invention are not exclusively intended to operate upon gases, liquids may also be employed and it is possible to envisage embodiments intended for work transmission between liquid and gaseous fluids.

Pressure exchangers as now set forth have many applications, particularly as components of heat engine plant.

The present invention provides a heat engine comprising a first pressure exchanger receiving gas at a first pressure level and discharging said gas at two pressure levels one higher and the other lower than said first level, a gas heating system receiving gas at said higher pressure level from the first pressure exchanger and discharging hot gas and a second pressure exchanger receiving said hot gas and gas discharged at said lower pressure level from the first pressure exchanger and discharging a stream of hot gas.

The hot gas stream, the gas at the lower pressure level of the first pressure exchanger or further gas received at the first pressure level may be expanded through an expansion machine. The latter is preferably a gas turbine.

If the second pressure exchanger is arranged to receive a further gas supply at a low temperature compared with the hot gas, greater heat may be introduced via the heating system. It is possible by replacement of the heating system with an internal combustion engine to supercharge the latter.

The expanded hot gases leaving a conventional compressor-gas turbine set may conveniently be introduced into a pressure exchanger with a lower pressure gas supply. The discharged gas therefrom may then be expanded through a nozzle to produce a highly efficient propulsive thrust.

In another possible arrangement of a compressor-gas turbine set, hot gas leaving the heating system to the set is introduced into a pressure exchanger together with a lower pressure gas supply. The gas discharged from the pressure exchanger is then expanded through the turbine. By this arrangement the heating system can be allowed to introduce more heat than otherwise would be the case.

The invention will now be described with reference to certain embodiments thereof shown by way of example only in the accompanying drawings in which:

Figure 3 is a peripheral development of part of the cell wheel and ducting making up the embodiment of Figure 1.

Figure 5A is a perspective view of a component of the apparatus of Figure 5.

Figure 1:
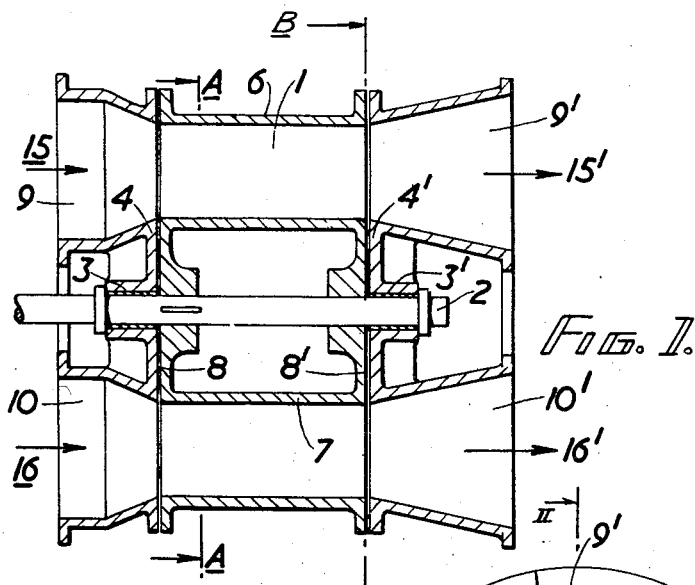
Figure 1 is a cross-sectional elevation through a pressure exchanger according to one embodiment of the invention, the upper half being a section at right angles to the lower half and shown as section II—II of Figure 2.
Figure 2:
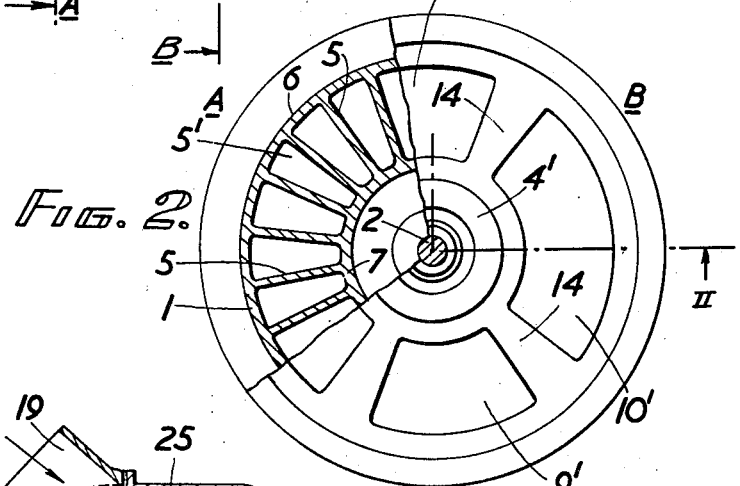
Figure 2 shows in its sector A a cross-section on the line AA of Figure 1 and in its sector B the face of an end plate of the same embodiment viewed at the position BB, i.e. from the right hand end of the cell wheel structure 1 of Figure 1.

Turning first to the embodiment shown in Figures 1 to 3 there will be seen a rotary cell wheel 1 carried by a shaft 2 which is itself located in bearings 3 and 3'. The bearings are nested within end plates at opposite ends of the cell wheel as shown at 4 and 4'. The rotary cell wheel consists of a cylinder with a peripheral annulus formed between the outer wall 6 and the inner wall 7, which annulus is divided by axial/radial partitions 5 (which can best be seen in Figure 2) thus forming a number of cells 5'. The end faces 8 and 8' of the cell wheel are located closely adjacent to the respective faces of the end plates 4, 4' and sealing arrangements (not shown) are provided between the cell wheel faces and the end plates to reduce leakage losses. Such seals may take the form of labyrinth glands or sliding seals for example. They need not necessarily be on opposing faces in the radial plane as shown in Figure 1 but can quite well be provided on cylindrical surfaces, that is co-axial with the rotor and in some circumstances this may be preferable. In Figure 3 opportunity has been taken to show that the partitions 5 making up the cells 5' of the cell wheel need not necessarily be axial but can be inclined to the axial plane. Each end plate has ducts extending through it away from the cell wheel through which fluid is arranged to pass to and from the cell wheel. The duct passages 9, 9', 10, 10', in the end-plates are arranged in circumferentially spaced fashion around the shaft axis and are separated from one another by partitions 11, 11', 12, 12', 13, 13', shown clearly in Figure 3.

In the faces of the end-plates adjacent to the cell wheel there are sector shaped wall sections such as that shown at 14 in Figure 2 which divide the duct passages from one another. The passages themselves, such as that shown at 9, may be formed either as convergent or divergent passages as is required by the design of the pressure exchanger. In Figure 1 the arrows 15, 15', 16, 16', are intended to show the direction of flow of gas through the pressure exchanger and in Figure 3 will be seen an arrow 17 which indicates the direction of rotation of the cell wheel relative to the stationary end plates. In this embodiment it is the cell wheel that rotates but it is clearly apparent that relative rotation may be obtained between cell wheel and end plates by an arrangement of end plates which itself rotates, the cell wheel being a stationary structure. As shown in Figure 1 the rotating cell wheel mounted upon the shaft 2 may be driven by an external drive connected to the free end of the shaft.

The end plates 4 and 4' can be secured to each other as a rigid structure but they are preferably arranged relative to the cell wheel so that there is allowance for expansion. The supporting arrangement then has to be such as permit axial displacement of the end plates relative to one another without any tilting being permitted. This is required so that the sealing system between end plates and cell wheel may be maintained. An arrangement has been previously described in U.S. Patent Application Serial No. 323,490, now U.S. Patent 2,779,530 in which the clearance gap between cell wheel and end plate is kept substantially constant in spite of thermal expansion. Use was made of bearings which are capable of taking axial thrust and are arranged closely to the clearance gap which is to be maintained. Tilting of the end plate was also prevented by the provision of guiding means which allows the end plate to be displaced in an axial direction only.

The operation of the pressure exchanger shown in the first three figures is as follows:

It will be recalled that in Figure 1 the ducts 9 and 10, and 9' and 10' are alternately arranged around the shaft axis, in fact approximately at right angles to one another as is more clearly shown in the sector B of Figure 2. The two diametrically opposite ducts 9 are bifurcated upstream of the pressure exchanger from a single duct. The same arrangement applies to the inlet passages 10. These are also bifurcated branches of a single duct. The duct leading to the inlet passages 9 communicates with the source of fluid at one pressure and the duct leading to the inlet passages 10 communicates with a source of fluid at another pressure. One of these pressures may conveniently be atmospheric pressure the fluid supplied being ambient air. The outlet passages from the pressure exchanger 9' and 10' are either each connected to sources of fluid at different pressures or are all connected to one single outlet duct downstream of the pressure exchanger. In the latter case the outlet duct is itself maintained at a pressure intermediate between the pressure levels of the two inlet fluid supplies.

It will be seen that the low pressure fluid entering the cell wheel does so by means of passages which alternate with passages for the entry of fluid at a higher pressure.

Different pressure levels exist at the other end of the cells, e.g. two pressures between the higher and lower fluid entry pressures. Thus the cells receive impulses of high pressure fluid causing acceleration in each cell followed by periods of depression where the low pressure fluid acts on a cell thereby effecting deceleration therein. At the other end of each cell fluid contained therein is delivered to the pressure level obtaining in the adjacent duct passage, the entering fluid of higher pressure in effect pumping or compressing the entering fluid of lower pressure which also enters, to the two leaving pressure levels. Thereafter the latter fluids are used to provide reactive thrust or expanded in an expansion machine or employed in some other convenient way.

The relationship between the spacing of the cell partition walls 5 and the width of the ducts 9, 9', 10, 10', has been previously discussed in relation to other pressure exchanger proposals. As shown in Figure 3, e.g. at 14 and 14', the end plate walls have distinct parts which provide duct passages from one another and which provide that communication between any cell and the ducts shall be intermittent. It is preferred that this should be so even when one end of all the cells is opened only to a common fluid pressure level. The duct passage openings in the end plate walls are preferably so located that an end of a cell is closed by the end plate wall substantially at the instance of arrival at that cell end of a compression or expansion impulse caused by the other end of the cell being closed. It is also preferable that an impulse caused by an end of a cell being opened to a duct passage should reach the other end of the cell at the instant when that other cell end is opened to its passage. Although it is not possible to define as closely as one would wish the instant at which a cell passes a duct passage edge and thereby gives rise to an impulse in the cell, it is desirable that a cell should remain in contact with a duct for a period equal to the time required for an impulse to travel from one end of a cell to the other and back again or an integral multiple thereof.

The parts of the end plate walls between various duct passages leading to and from the cell wheel may not be of equal width due to the fact that depression impulses become extended in length when travelling through the cell and compression impulses are decreased in length. Considering this in connection with Figure 3 there will be seen there an end plate structure 11 having a wall adjacent the cell wheel 14. At the other end of the cell wheel there is the end plate having a part of the wall between adjacent passages shown at 14'. The impulse due to the closing of a cell by the end wall part 14 has to reach the other end of the cell at the moment when the end plate wall 14' is closing the same cell. However, when a cell passes the end plate wall 14 and is opened thereby the impulse travelling to the other end of the cell has to reach there at the same moment when the cell is being opened by the end plate wall edge 14'. As the rotation of the cell wheel is at constant angular velocity and the times for the impulses to travel through the cell are different the widths of the end plate wall sectors 14 and 14' are preferably themselves different for efficient operation.

Consider higher pressure fluid entering into the pressure exchanger of Figure 3 in the direction of the arrows 16 through the entry passage 10. In the left hand cell of the peripheral development of the cell wheel there is fluid at a pressure lower than the fluid entering through the passage 10, and its other end opening to passage 9' is also at a lower pressure hence the fluid in the cell is accelerated. The higher pressure fluid entering the cell sets up an acceleration impulse which is able to pump the fluid in the cell to the pressure level obtaining in the duct 9' which is assumed to be higher than that in duct passage 10'. Fluid therefore leaves the cell in the direction of the arrow 15'. On connection of the same cell to the outlet passage 10' and to the inlet duct 9 where a lower pressure obtains the pressure difference between the ends of the cell changes sign and retardation of the fluid flow is caused. However a depression exists at the upstream end of a cell as it becomes opened to passage 9 and fluid continues to enter the pressure exchanger. At the downstream end of the cell fluid is discharged into the passage 10' in the direction 16'. The cell proceeds on its way and once again it becomes open at its upstream end to a fluid of higher pressure through the next duct 10 and an acceleration impulse pumps the fluid in the cell out through the next outlet passage 9'.

The high pressure fluid supplied to the pressure exchanger may conveniently be the hot combustion products from a combustion system. Where this is so and the lower pressure fluid is atmospheric air there is a very useful application of this machine to gas turbine plant in a manner which will be described in more detail below.

Figure 4:
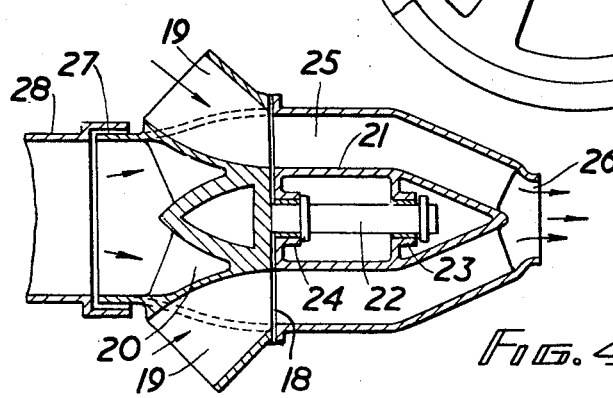
Figure 4 is a cross-sectional elevation through a second embodiment of the invention and Figure 5 shows a corresponding view of a third embodiment of the invention.

In the embodiment of the invention illustrated in Figure 4 it will be seen that there is only one end plate proper, namely that shown at 18 which carries ducts 19 and 20 for fluids at two different pressure levels entering the pressure exchanger. In this diagram it is more clearly shown how the entry duct 20 is bifurcated upstream of the pressure exchanger, fluid supplied therefrom going to diametrically opposed duct passage openings in the end plate adjacent to the cell wheel. The cell wheel rotor 21 is supported by a shaft 22 which runs in bearings 23 and 24. The cells 25 themselves are of more complicated from than those shown in the embodiment above in that they are partly conical. Their downstream ends open into a common discharge orifice 26 through which fluid leaves the pressure exchanger. As in the previously described embodiment two fluids at higher and lower pressure levels enter the device by the ducts 19 and 20 respectively which alternate peripherally around the annular entry into the cells 25 through the end plate 18. The common duct terminating in the discharge orifice 26 is in this case maintained at a pressure intermediate between the two inlet pressures and the fluid leaves the cells at that pressure. Pressure is immediately transformed into velocity but in operation it can be considered that a pressure difference exists across the ends of each cell. An embodiment very similar to that shown in Figure 4 can be clearly envisaged in which it is the end plate structure which rotates to a stationary cell wheel. Such a possibility is illustrated by the mating together of the rotating and stationary parts of the inlet duct 20 by the peripheral surface 27 running within the stationary bearing surface at the end of the duct 28. This arrangement will not only permit rotation but will take up axial displacement of the end plate. A labyrinth seal or the like would be included in this arrangement. If it is so desired the orifice 26 may be shaped as a nozzle so that the fluid leaving the pressure exchanger can expand and accelerate.

Figure 5:
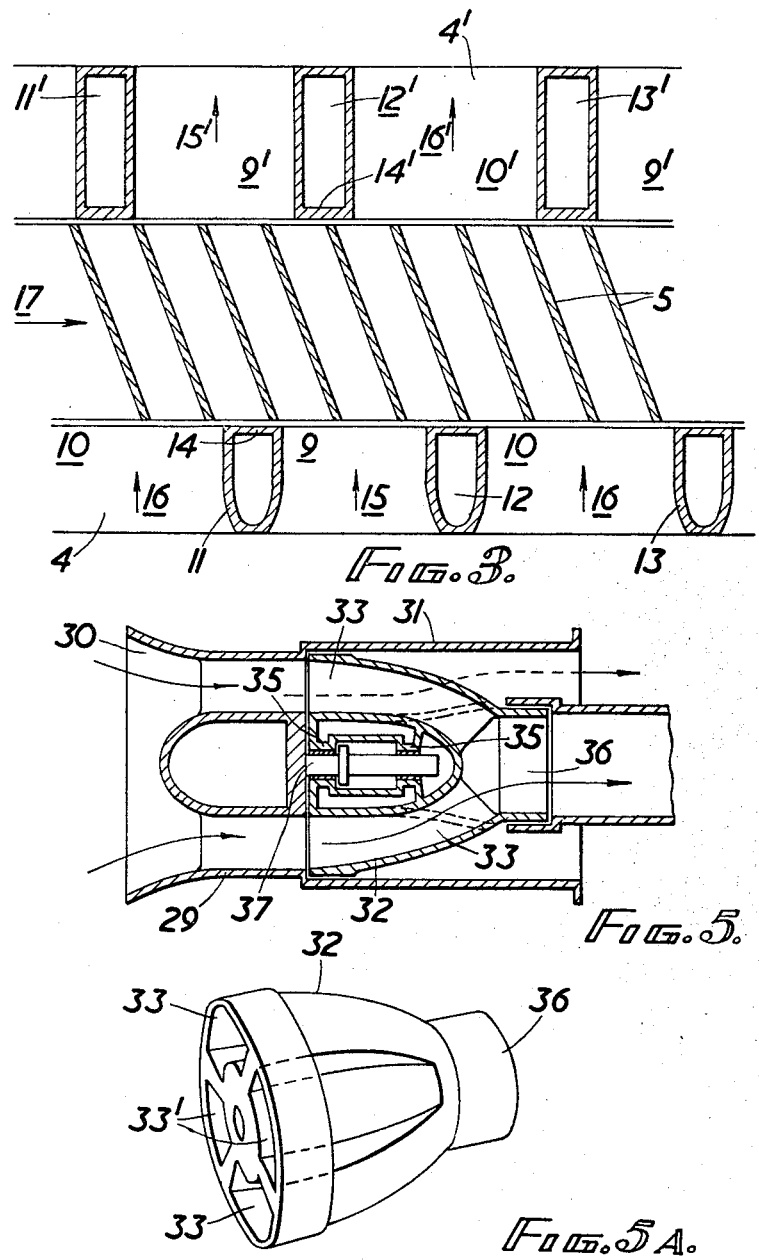

While the two embodiments described above have been pressure exchanging and pressure equalizing arrangements, that shown in Figure 5 is a pressure dividing arrangement. A rotary cell wheel 29 is formed integrally with the ducting through which fluid is passed to the cell wheel. Fluid enters the cell wheel in this case at one pressure level only. Also integral with the cell wheel itself is a cylindrical duct 31 into which is discharged fluid at one of the two outlet pressure levels. In this instance it is the end plate which is rotatable relative to a stationary cell wheel, the end plate being shown at 32. It comprises ducts 33 for fluid leaving the pressure exchanger at a different pressure from that of fluid leaving through the cylindrical duct 31. The end plate is supported by a shaft 37 which runs in bearings 35. The outlet duct passages 33 join into a common conduit 36 in which there is maintained a pressure level either higher or lower than the input pressure level.

In Figure 5A there will be seen a diagrammatic perspective view of the end plate 32, showing in particular the arrangement of the outlet ducts. The two ducts 33 in the upstream end of the end plate allow fluid to pass through to the common outlet conduit 36. The two other diametrically opposed ducts 33' allow fluid to pass to the outside of the end plate 32 halfway along its length. Referring back to Figure 5 it will be seen that this allows the fluid taken through these ducts to be discharged through the cylindrical duct 31. The duct 31 and the conduit 36 are maintained at two different pressure levels one above and the other below the input pressure level to the pressure exchanger.

The embodiment shown in Figure 5 therefore provides a pressure divider one part of the fluid entering into the pressure divider having imparted work to another part of the same fluid. Fluid enters the pressure divider at a medium pressure and is delivered at the other end of the cell wheel into alternatively arranged duct passages one group being at a higher pressure and the other at a lower pressure than the entering pressure. When the downstream end of any cell is connected to the lower pressure outlet duct there is an acceleration of the fluid in the cell and when it is connected with the higher pressure duct then there is deceleration of the fluid. Hence, one part of the entering fluid pumps or compresses another part of the same fluid to a higher pressure while that part which has performed the work leaves at reduced pressure.

It is possible to allow the fluid to expand by increasing its speed before leaving the pressure exchanger. In such a case of course, the pressure at which the fluid leaves the exchanger will be lower than it would otherwise have been.

Although in the aforedescribed embodiments not more than two groups of ducts are provided at each end of the cell wheel for the ingoing or for the outgoing fluids, it is nevertheless possible without basically modifying the process or the apparatus, to provide in the end plates, more than two groups of ducts separated by partition walls. Such an apparatus in accordance with the present invention is then capable of taking in fluids at more than two pressure levels and delivering fluids at more than two different pressure levels.

Figure 6:
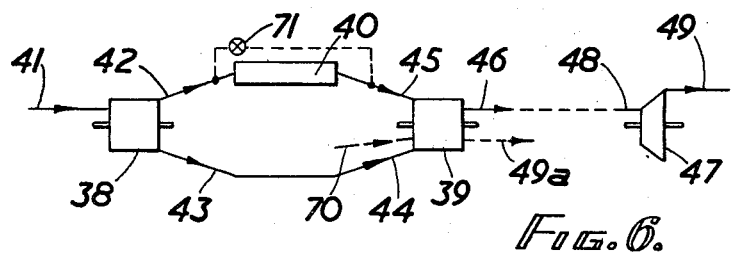
Figures 6, 7 and 8 show three alternative ways in which pressure exchangers according to the invention can be incorporated into new heat engine arrangements in order to achieve certain desired advantages.

The pressure exchangers described above may be combined in many ways with other similar apparatus or with different apparatus. For example, pressure exchangers may be connected in series and they may be combined with combustion processes or heat introduction or abstraction in different forms. Some of the possible ways of use of the different embodiments of the invention described above will now be set forth. Reference will be made to Figures 6 to 10 which all show applications of the present invention. In Figure 6, 38 is a pressure divider, air entering at 41 and leaving at 42 at a higher pressure and at 43 at a lower pressure. At 40 is a combustion chamber, or other heating means, in which the air entering at 42 is heated, leaving at an elevated temperature through the duct 45. The higher and lower pressure gases are brought together through the ducts 44 and 45 in a pressure equalizer 39, from which the gases are discharged into duct 46, at a pressure higher than prevails at the intake 41. The compressed hot gas at 46 may be utilized to expand through a nozzle and produce thrust, or it may be led to an expansion machine, e.g. a turbine 47, through a duct 48. Useful work is produced and the exhausted gas leaves at 49.

The gas leaving the pressure exchanger 39 may be abducted therefrom, according to an alternative scheme, at two pressure levels; one of which, at 49A, is ambient pressure. This facilitates scavenging and results in a higher efficiency than if the exhaust pressure was above ambient pressure.

It is also possible as a further alternative to take in at 70 ambient air e.g. in order to be able to increase the temperature at 45 without raising the resulting temperature of the pressure exchanger 39.

Supercharging and scavenging of an internal combustion engine for instance two stroke engines, can also be performed by pressure exchangers in a manner based upon the Figure 6 layout. In fact, apparatus taking in gas and delivering it at a higher temperature can be supercharged by a pair of pressure exchangers arranged with the apparatus in place of the combustion chamber 40 of Figure 6. Thus any process such as the firing of a boiler and certain chemical processes can be supercharged as described. The device to be supercharged may advantageously be by-passed by a conduit provided with control means 71 by which it may be throttled or entirely closed.

Figure 7:
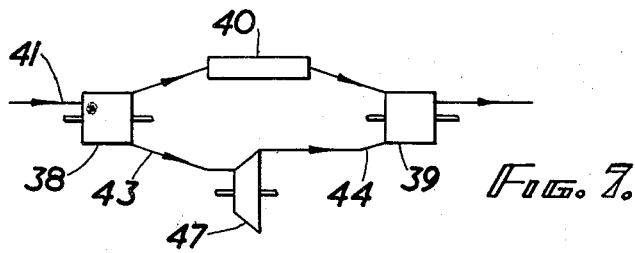

In arrangements in which pressure exchangers are applied in connection with a turbine, or other expansion machine, to produce mechanical work, the turbine may be so positioned so that unheated gases only flow through it. This arrangement is illustrated in Figure 7 where the turbine 47 is situated in the gas flow between the pressure divider 38 and equalizer 39. The gas enters the turbine at 43 and leaves at 44, with a corresponding drop in pressure. Since the combustion products do not pass in this case through the turbine the arrangement would permit the use of fuels normally excluded because of damage they are expected to cause to the turbine e.g. pulverised coal may be burnt in the combustion chamber 40.

Figure 8:
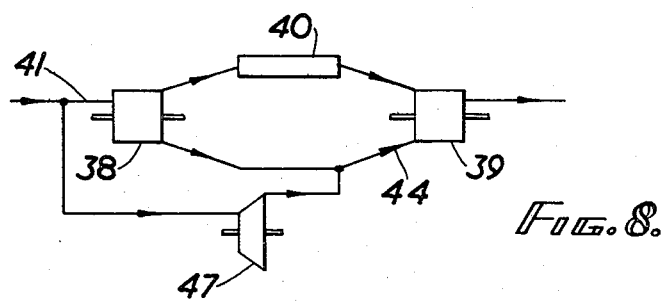

In another alternative arrangement the turbine 47 may work in parallel with the pressure divider, as in Figure 8 the air entering into the turbine in a parallel branch of 41, and leaving at lower pressure. The air leaving the turbine is taken into the pressure equalizer at the same pressure as prevailing in conduit 44, or at a similar pressure level.

The high pressure fluid supplied to a pressure exchanger may be hot gas exhausted from a compressor-turbine set, which it leaves at a pressure above that of the ambient air as is the case in a jet engine. Such gas entering the pressure exchanger, e.g. at 20 on Figure 4, together with low pressure fluid in the form of ambient air entering at 19, can compress the latter and supply gas into a receiver at higher pressure than that of the ambient air. After this the gases can be made to expand through a nozzle orifice (e.g. 26, Figure 4), into the surrounding atmosphere to produce reactive thrust. By such a combination the propulsive efficiency and the thrust are raised, especially at the lower range of speeds at which the engine is moved through the atmosphere.

Figure 9:
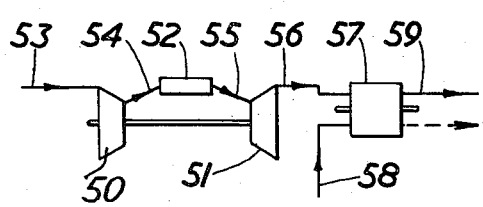
Figure 9 shows the incorporation of a pressure exchanger according to the present invention in a gas turbine jet propulsion engine.

A schematic arrangement for the purpose described is shown on Figure 9. A compressor 50 is driven by turbine 51 with the combustion system 52 in between. The air enters at 53, leaves the compressor at 54, and after taking up heat enters the turbine at 55, from which it emerges somewhat expanded at 56 and enters the pressure equalizer 57. An ambient air supply is taken in at 58, is compressed in the pressure equalizer and both streams leave together at 59, producing thrust. Alternatively of course, the stream may be expanded in a second turbine as in a turbo-propeller engine. In another arrangement two streams may leave from a pressure exchanger substituted for the equalizer 57.

Figure 10:
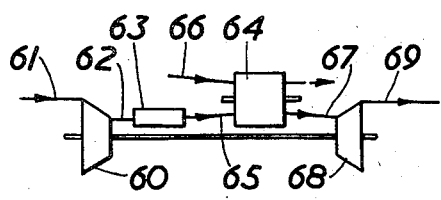
Figure 10 shows an alternative arrangement of gas turbine plant lay-out in which the position of the pressure exchanger is different.

A further alternative scheme is shown in Figure 10. Here the air entering the compressor 60 at 61, and leaving same at 62, is heated in a combustion system for example at 63 and is led into the pressure equalizer 64 at 65. Air is also taken into the equalizer at 66. The gas leaves the pressure equalizer at 67, enters turbine 68, which drives the compressor and emerges therefrom at 69. If the production of jet thrust is the purpose, then this is produced by the flow at 69; if work on a shaft is to be produced, then this can also be achieved in well known manner. In this alternative the temperature at 65 can be very high, since it is brought down to an acceptable figure by dilution with the incoming air at 66. Thus neither the turbine 68 nor the pressure equalizer are exposed to excessive temperatures.

This method of reducing the temperature of a gas, without excessive loss of mechanical work available, by diluting a hot gas with a cooler one in a pressure exchanger, is generally applicable. For instance, it makes possible a powerful reheat between the turbine 51 on Figure 9 and the pressure exchanger, or after the pressure exchanger, by which the thrust will be increased further. Since the pressure exchanger receives also cool ambient air, the high reheat temperature will cause no harm in the device.

The fluids employed in pressure exchangers according to the invention may be gaseous or liquids or both combined. It is expected to be possible for instance, to pump by a gas of higher pressure, liquid from a lower pressure to a higher pressure or it can be accelerated to a higher speed.

What I claim is:

1. A pressure exchanger in which gas compression and gas expansion proceed simultaneously comprising a first cylindrical structure having cells around the periphery thereof, a second structure including an end plate adjacent one axial end of said first structure, means for effecting relative rotation between said first and second structures, a plurality of segmental outlet ports in said end plate, together occupying substantially the whole circumferential extent of said end plate and each outlet port being of such circumferential width that in the design conditions of operation wave action initiated within the cells by a leading port edge affects the complete axial length of a cell in both forward and reverse direction, and wall sections in said end plate between adjacent ports each of substantially the same circumferential width as a cell.

2. A pressure exchanger as claimed in claim 1 and comprising a single inlet duct forming part of said second structure and communicating with said cells at their ends opposite said one end.

3. A pressure exchanger as claimed in claim 1, in which said second structure includes an additional end plate adjacent the axial end of said first structure opposite to said one end, at least one segmental inlet port being provided in said additional end plate, the port width occupying substantially the whole circumference of the additional end plate.

4. A pressure exchanger as claimed in claim 3, in which a plurality of said inlet ports are provided, wall sections in said additional end plate between adjacent ports each being of substantially the same circumferential width as a cell and in which said inlet and outlet ports are staggered circumferentially.

5. Apparatus comprising first and second pressure exchangers, said pressure exchangers comprising cells in which gas expands so compressing another part of that gas with which it is in direct contact, said cells forming a continuous boundary for the gas flowing through them and extending in the direction of gas flow ducting to lead gas to and from the cells at different pressure levels, and means to effect relative motion between the cells and the ducting, the first pressure exchanger receiving gas through said ducting at a first pressure level and discharging said gas through said ducting at two pressure levels one higher and the other lower than said first level, said apparatus further comprising a gas heating system receiving gas at said higher pressure level directly from the first pressure exchanger and discharging hot gas, and the second pressure exchanger receiving said hot gas directly from the heating system together with gas discharged at said lower pressure level from the first pressure exchanger and discharging a stream of hot gas.

6. A heat engine incorporating pressure exchanger apparatus as claimed in claim 5 and in which an expansion machine is provided through which said stream is expanded to perform useful work.

7. A heat engine incorporating pressure exchanger apparatus as claimed in claim 5 in which said second pressure exchanger has three inlet ducts, a first duct to receive said hot gas from said gas heating system, a second duct to receive gas discharged at said lower pressure level from said first pressure exchanger and a third duct to receive a further gas supply at a low temperature compared with said hot gas whereby greater heat may be introduced via the heating system than would otherwise be permissible.

8. A heat engine incorporating pressure exchanger apparatus as claimed in claim 5 modified in that an internal combustion engine required to be supercharged at said higher pressure level and scavenged is substituted for said heating system.

9. A heat engine incorporating pressure exchanger apparatus as claimed in claim 5 in which said second pressure exchanger has two outlet ducts, a first duct for said hot gas stream and a second duct for a second output stream of gas at a lower pressure level than said discharged hot gas.

10. A pressure exchanger in which gas compression and gas expansion proceed simultaneously, comprising a first cylindrical structure having cells around the periphery thereof, an inlet duct through which fluid enters the cells at one end of said first cylindrical structure, a second structure including an end plate in juxtaposed relation to the other end of said first cylindrical structure, means for effecting relative rotation between said first and said second structures, the fluid in the cells of said first structure being subjected to acceleration and deceleration impulses to create pressure differences between opposite ends of the cells in the said first cylindrical structure, said end plate having a plurality of outlet ports and ducting communicating with said outlet ports for the passage of fluid from the cells of said first cylindrical structure to alternate outlet ports and ducts at pressure levels respectively above and below the pressure of the fluid in the inlet duct of said first cylindrical structure.

11. A pressure divider in which gas compression and gas expansion proceed simultaneously, comprising a cylindrical structure having cells around the periphery thereof, an inlet duct through which fluid enters the cells at one end of said cylindrical structure, an end plate in juxtaposed relation to the other end of said cylindrical structure, means for effecting relative rotation between said end plate and said cylindrical structure, said end plate having therein a plurality of outlet ports communicating with said cells, wall sections in said end plate separating said outlet ports, the width dimensions of said outlet ports, wall sections and cells being of such magnitudes relative to each other that in the designed conditions of operation the fluid from said inlet duct is delivered to alternate outlet ports via said cells at pressure levels respectively above and below that of the fluid in said inlet duct.

12. A pressure divider in which gas compression and gas expansion proceed simultaneously, comprising a first cylindrical structure having cells around the periphery thereof, an inlet duct through which fluid enters the cells at one end of said first cylindrical structure, a second structure including an end plate in juxtaposed relation to the other end of said first cylindrical structure, means for effecting relative rotation between said first and second structures, said end plate having therein a plurality of segmental outlet ports which together occupy substantially the whole circumferential extent of said end plate, each outlet port being of such circumferential width that in the design conditions of operation the fluid in the cells is subjected to acceleration and deceleration impulses initiated by the leading and trailing edges of the outlet ports which impulses create pressure differences between opposite ends of said cells, ducting communicating with said outlet ports, wall sections separating said outlet ports in said end plate, said wall sections being of substantially the same circumferential width as said cells, the width dimensions of said outlet ports, wall sections and cells being of such magnitudes relative to each other that in the designed conditions of operation the fluid from said inlet duct is delivered to alternate outlet ports via said cells at pressure levels respectively above and below that of the fluid in said inlet duct.

References Cited in the file of this patent

UNITED STATES PATENTS

| | | |
|---|---|---|
| 2,045,152 | Lebre | June 23, 1936 |
| 2,396,911 | Anxionnaz et al. | Mar. 19, 1946 |
| 2,399,394 | Seippel | Apr. 30, 1946 |
| 2,405,919 | Whittle | Aug. 13, 1946 |
| 2,461,186 | Seippel | Feb. 8, 1949 |
| 2,503,410 | Pouit | Apr. 11, 1950 |
| 2,526,618 | Darrieus | Oct. 24, 1950 |
| 2,620,621 | Nettel | Dec. 9, 1952 |
| 2,651,911 | Sterland | Sept. 15, 1953 |
| 2,726,508 | Halford et al. | Dec. 3, 1955 |
| 2,738,123 | Hussmann | Mar. 13, 1956 |
| 2,757,509 | Jendrassik | Aug. 7, 1956 |
| 2,762,557 | Jendrassik | Sept. 11, 1956 |
| 2,766,928 | Jendrassik | Oct. 16, 1956 |

FOREIGN PATENTS

| | | |
|---|---|---|
| 2,818 | Great Britain | Feb. 5, 1906 |